Oct. 14, 1958  A. C. SCHRIMSHAW  2,856,214
SHAFT CLAMP AND CONTROL LEVER CONSTRUCTION
Filed Dec. 27, 1955  2 Sheets-Sheet 1

INVENTOR
ALBERT C. SCHRIMSHAW
Paul O. Pippin
ATTORNEY

Oct. 14, 1958     A. C. SCHRIMSHAW     2,856,214
SHAFT CLAMP AND CONTROL LEVER CONSTRUCTION
Filed Dec. 27, 1955     2 Sheets-Sheet 2
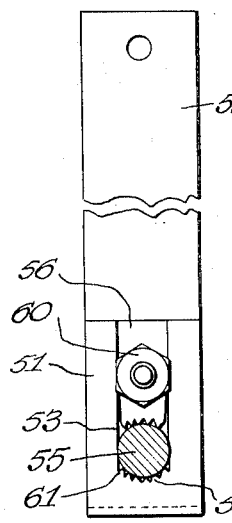
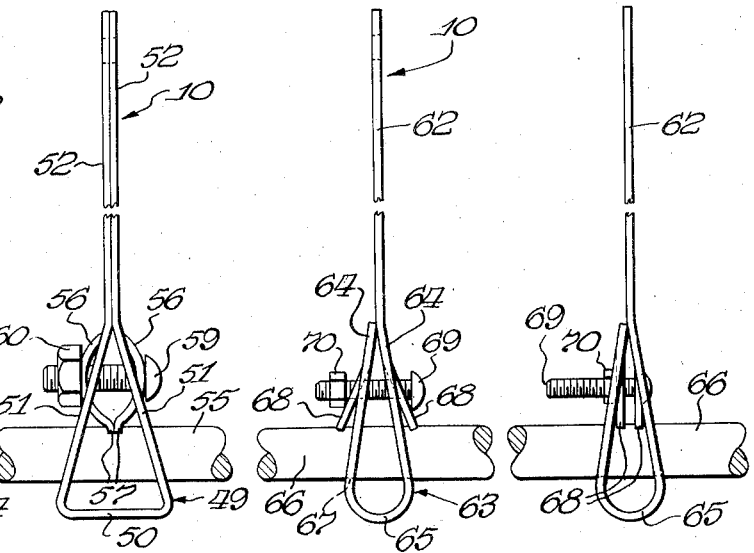
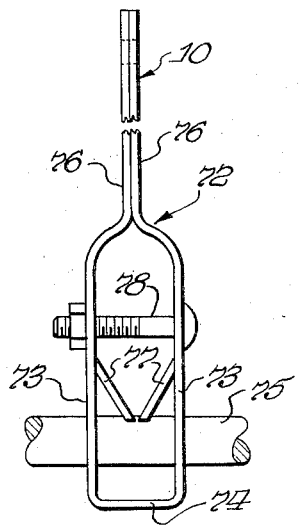
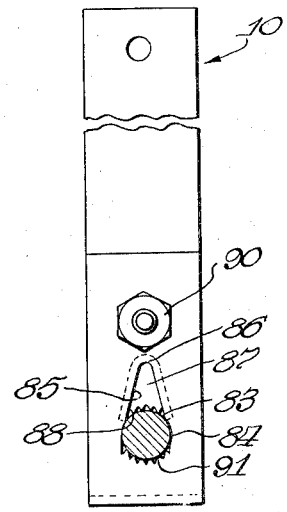
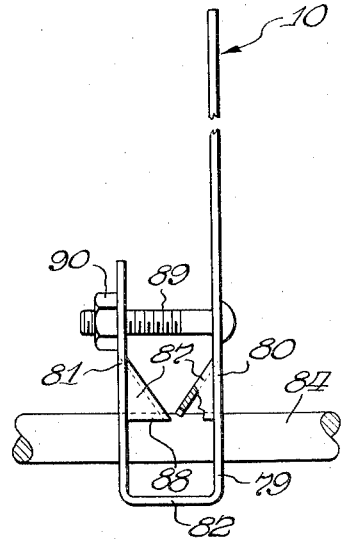
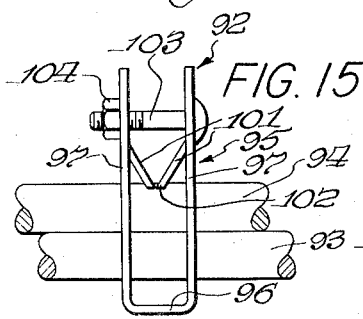
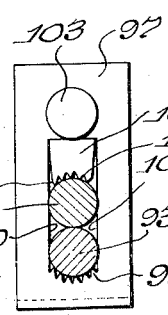
INVENTOR
ALBERT C. SCHRIMSHAW
ATTORNEY United States Patent Office 2,856,214
Patented Oct. 14, 1958

2,856,214

SHAFT CLAMP AND CONTROL LEVER CONSTRUCTION

Albert C. Schrimshaw, Haviland, Ohio

Application December 27, 1955, Serial No. 555,735

2 Claims. (Cl. 287—54)

This invention relates to a new and improved scuring means for adjustably connecting two rods or shafts or for adjustably connecting a lever, or the like, to a rod or shaft and more particularly to securing means which are economical to manufacture and are attachable to and detachable from rods or shafts associated therewith and are adapted to be firmly and rigidly fastened to the rods or shafts associated therewith so as to be fixed and immovable with respect to the rods or shafts in use.

An important object of the present invention is the provision of a simple and inexpensive lever in which novel means are incorporated therein for rigidly clamping the lever to a rod or shaft.

A still further object is the provision of a coupling device for securing two parallel shafts or rods together.

Another object of the present invention is to provide a coupling device for adjustably securing a pair of rods or shafts together wherein the axis of one rod extends substantially normally to the axis of the other rod or shaft.

The foregoing and other important objects and desirable features inherent in and encompassed by the invention, together with many of the purposes and uses thereof, will become readily apparent from a reading of the ensuing description in conjunction with the annexed drawings, in which:

Figure 8 is a side elevational view of a modified form of lever construction embodying the invention;

Figure 9 is an end elevational view of the lever construction shown in Figure 8;

Figure 10 is a side elevational view illustrating another embodiment of the invention;

Figure 11 is a side elevational view of the lever construction shown in Figure 10 rigidly clamped to the shaft associated therewith;

Figure 12 is a side elvational view of a modified form of lever construction shown rigidly fastened to an operating shaft or rod;

Figure 13 is a side elevational view of still another modified form of lever construction;

Figure 14 is an end elevational view of the lever construction shown in Figure 13;

Figure 15 is a coupling device for adjustably connecting a pair of rods or shafts wherein the axes of the shafts or rods lie in a single plane; and Figure 16 is a side elevational view of the coupling device shown in Figure 15.

Figure 1:
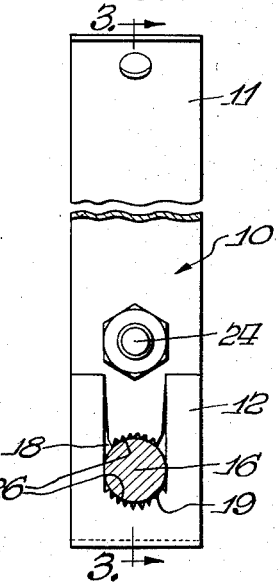
Figure 1 is a side elevational view, partly in section, illustrating a control lever incorporating the invention rigidly fastened to an associated control rod or shaft.
Figure 3:
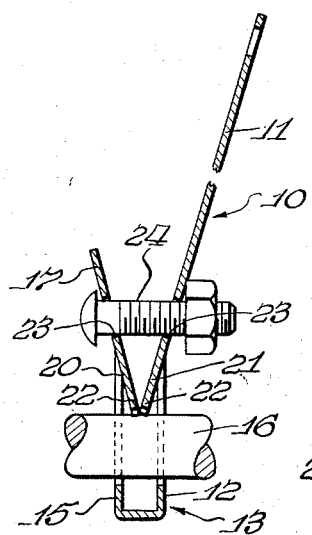
Figure 3 is a view similar to Figure 2 showing the control lever mounted on the shaft except that the lever is not rigidly clamped to the shaft.
Figure 2:
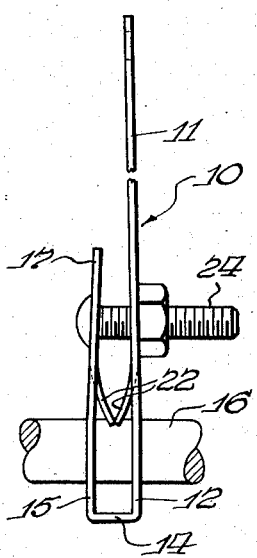
Figure 2 is an end elevational view of the lever shown in Figure 1.

Referring to the drawings in detail, wherein like reference characters designate like elements throughout the various views, and specifically to Figures 1 to 3 thereof, the first form of the invention will be described. Reference character 10 designates a lever which is stamped from sheet metal or other similar lightweight stock. The lever 10 includes an elongated shank 11. Integrally formed with one end of the shank 11, and disposed at an angle greater than 90° with respect thereto, is one leg 12 of a U-shaped portion 13. The bight portion 14 of the U-shaped portion 13 is bent at right angles with respect to the leg 12 and has one end thereof integrally formed with the other leg 15 of the U-shaped portion 13. Legs 12 and 15 are substantially parallel and spaced with respect to each other prior to being rigidly fastened to an operating shaft or rod 16, as shown in Figure 3. The legs 12 and 15 are of substantially the same length, and integrally formed with and extending angularly with respect to the leg 15 is a relatively short section 17. It will be noted that the angle between the short section 17 and the leg 15 is substantially equal to the angle between the elongated shank 11 and the leg 12 when the lever 10 is loosely mounted on the shaft 16, as shown in Figure 3. The leg 15 is provided with an elongated opening 18 which is in registration with a similar opening 18 formed in the other leg 12. Each opening is generally rectangular in shape with the exception of the lower end thereof, as viewed in Figure 1, which is defined by a semi-circular portion 19 of a respective leg 12, 15. The operating shaft 16 is adapted to extend through the openings 18. The radius of curvature of the semi-circular portion 19 is equal to or slightly greater than the diameter of the operating shaft 16. An elongated tongue 20 is integrally formed with that portion of the section 17 defining the upper marginal edge of the opening 18 formed therein, as viewed in Figure 3. A similar leg 21 is integrally formed with that portion of the shank 11 defining the upper marginal edge of the opening 18. When the lever is in its unclamped state, as shown in Figure 3, the dogs 20, 21 radially converge toward each other and the free ends 22 thereof are disposed adjacent each other. The free end 22 of each dog 20, 21 is curved and has a radius of curvature substantially equal to the radii of curvature of the portions 19.

The shank 11 and the short section 17 are provided with aligned apertures 23 through which a clamping bolt 24 extends axially with respect to the operating shaft 16. A cooperable nut 25 is threaded on the end of the bolt 24. When the lever 10 is in its unclamped condition as shown in Figure 3, sufficient clearance between the free ends 22 of the dogs 21 and the semicircular portions 19 is provided to permit the lever 10 to freely rotate as well as to slide axially with respect to the shafts 16. When the lever 10 is rotated and moved axially to the desired angular and axial position the lever is locked in place by drawing up the nut 25 which causes the section 17 and the shank 11 to approach each other, as shown in Figure 2. When this occurs the free ends of the dogs 22 move radially and are forced into frictional engagement with the adjacent surfaces of the shaft 16 and force the shaft 16 firmly into frictional engagement with the semicircular portions 19 of the legs 15 and 12. It will be appreciated that axial clamping action caused by the bolt 24 and nut 25 produces a movement of the dogs 20 in a direction substantially perpendicular to the axis of the shaft to thus cause a binding action between the parts which not only prevents relative rotation therebetween but relative axial movement as well. If desired, the inner surfaces of the curved portions 19 and the free ends 22 of their dogs 20, 21 can be serrated or roughened as indicated at numeral 26 in Figure 1 to further increase the binding effect of the lever 10 on the shaft 16. However, it is to be understood that the serrations 26 are unnecessary and may be provided solely for the purpose of additional security.

Figure 4:
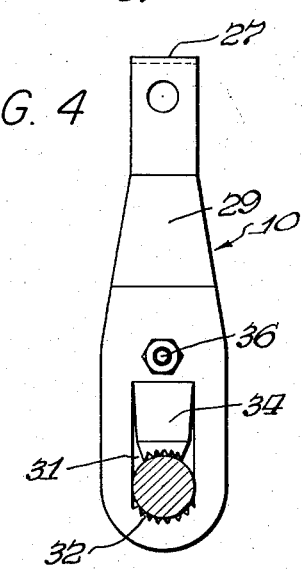
Figure 4 is a side elevational view of another embodiment of the invention.
Figure 5:
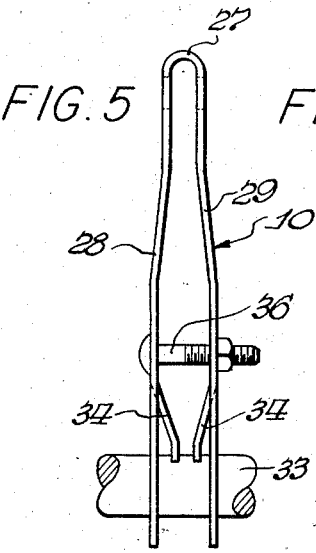
Figure 5 is an end elevational view of the lever construction shown in Figure 4.

Figures 4 and 5 illustrate another form of lever embodying the invention. The lever 10 is substantially U-shaped to provide a semicircular bight portion 27 and a pair of elongated legs 28, 29 integrally formed with the bight portion 27. The free ends 30 of the legs 28, 29 are somewhat enlarged as shown in Figure 4 and are provided with generally rectangular openings 31 therethrough which are substantial duplicates of the openings 18 described above with reference to the lever construction shown in Figures 1, 2 and 3 and thus have one end defined by a semicircular portion 32. An operating shaft 33 is adapted to extend loosely through the openings 31 and seat itself upon the semicircular portions 32. As in the lever construction described above, dogs 34 integrally formed with the respective portion of each leg defining the end of an opening 31 opposite the semicircular portion extend convergingly and radially toward the shaft 33. Each dog 34 is provided with a tip portion 35 bent at an angle with respect to the plane generally containing the main body of its associated dog 34. Each leg is provided with an aperture spaced radially outwardly from the dogs 34 which is in axial alignment with the aperture provided in the other leg. A clamping bolt 36 extends through the aligned apertures. In operation the lever 10 is moved to a desired angular and axial position with respect to the shaft 33 and thereafter a nut 37 is threaded on the bolt 36 tightly causing the tip portions 35 of the dogs 34 to engage the shaft 33. The tip portions 35 have a radius of curvature substantially equal to the radius of curvature of the semicircular portions 32 in order to increase the shaft engaging area of the tip portions 35. Thereafter further threading of the nut 37 in the direction to cause the legs 28, 29 to axially approach each other results in the dogs 34 transmitting a relatively high radial force to the shaft 33 urging the same tightly and firmly against the semicircular portions 32. It will be noted that the tip portions 35 when the lever 10 is in its fastened position lie in planes which are substantially parallel to the planes containing the enlarged free ends 30 of the legs 28, 29 and are axially spaced from each other, thus in effect four separate surface areas of the shaft 33 are frictionally engaged by portions of the lever, namely the tip portions 35 and the semicircular portions 32.

Figure 6:
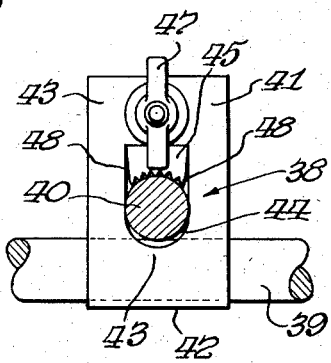
Figure 6 is a coupling device for adjustably securing a pair of rods or shafts disposed at right angles with respect to each other.
Figure 7:
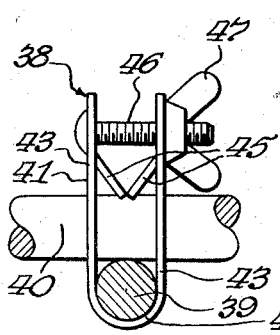
Figure 7 is an end elevational view of the coupling device shown in Figure 6.

In Figures 6 and 7 the invention incorporated in a clamping device designated in its entirety by numeral 38 for adjustably securing a pair of rods or shafts 39, 40 together, which shafts extend substantially at right angles with respect to each other. The clamping device includes a generally U-shaped member 41 which is formed out of sheet metal or other similar material. The bight portion 42 is generally semi-cylindrical in shape and integrally formed therewith at each end thereof is a leg 43. Intermediate the free end and bight portion 42 of each leg 43 is an elongated opening 44. The openings 44 are in registration and shaft 40 is adapted to extend therethrough. Shaft 39 disposed at right angles to the shaft 40 is adapted to seat itself on the interior surface of the bight portion 42. The lower edge of the openings 44, as viewed in Figure 6, are spaced from the ends of the bight portion 42 a distance less than the radius of the rod 39 such that when the rods 39 and 40 are assembled as shown in Figures 6 and 7, shaft 40 bears against shaft 39. Extending angularly inwardly from the portion of the legs 43 defining the edges of the openings 44 remote from the bight portion 42 are dogs 45. The free ends of the dogs 45 are serrated and have a radius of curvature substantially equal to the radius of the rod 40. Extending through the free ends of the legs 43 along an axis substantially parallel to the axis of the rod 40 is a bolt 46. A thumb nut 47 is adapted to be threaded on the bolt 46 and when drawn up tightly effects movement of the legs 43 toward each other which causes the curved free ends of the dogs 45 to impinge substantially the mid portion of the section of the shaft 40 disposed between the legs 43. As the thumb nut 47 is further tightened the dogs 45 press the shaft 40 tightly into engagement with the rod 39 which in turn is firmly pressed into engagement with the interior surface of the bight portion 42. Thus each rod 39, 40 is secured against movement along a line coinciding with its own axis with respect to the other rod. It will also be noted that inasmuch as the seating surface of the rod 39 is semi-cylindrical the rod 39 is incapable of moving angularly with respect to the rod 40, and by the same token rod 40 is incapable of moving angularly with respect to rod 39 by the side edges 48 of the legs 43. It will be readily apparent from this construction that a pair of rods disposed substantially at right angles with respect to each other may be quickly and easily clamped together in any desired position without fear of the rods being unintentionally loosened or disassembled in use.

In the modified lever construction shown in Figures 8 and 9 the lever in its entirety is designated by numeral 10 and includes a single elongated piece of material having its central section substantially in the form of a triangle designated generally by numeral 49. The triangle includes a bottom section 50 having converging side sections 51 integrally formed therewith. Extending from the abutting ends of the side sections 51 are elongated shank portions 52 which are arranged back to back. The side sections 51 are provided with elongated openings 53 therethrough which extend from the abutting ends of the side sections to points spaced from the bottom section 50. The ends of the openings 53 opposite the abutting ends of the side sections 51 are defined by semicircular portions 54 of the side sections 51. An operating shaft or rod 55 is adapted to extend through the openings 53, preferably quite loosely, and seat itself upon the curved portions 54. Integrally formed with each shank portion 52 at the juncture thereof with an associated side section 51 is an outwardly bowed dog 56. As shown in Figure 9 the free end of each dog is provided with a tip portion 57 having a curved edge 58 conforming to the circumference of the shaft 55. Each dog is further provided with an aperture substantially midway between its ends through which a clamping bolt 59 extends axially with respect to the shaft 55. In use after the lever 10 is moved angularly and axially with respect to the shaft 55 a cooperable lock nut 60 is threaded on the bolt 59. As the threading continues the bowed dogs 56 are urged toward each other until the tip portions 57 abut each other. Continued drawing up of the nut 60 results in radial elongation of the dogs 56 and since the edges 58 are formed to conform to the shaft 55, such radial elongation of the dogs 56 results in the edges 58 being impinged on the shaft 56 to tightly force the shaft 55 into frictional engagement with the semicircular portions 54 of the openings 53. It will thus be seen that the lever 10 when the nut 60 is threaded on the bolt 59 to force the dogs 56 toward each other will be very rigidly clamped to the shaft 55 between the curved edges 58 of the dogs 56 and the semicircular portions 54 which may, if desired, be provided with serrations as indicated by numeral 61.

The lever construction 10 shown in Figures 10 and 11 includes an elongated shank 62. Integrally formed with one end of the shank 62 is a substantially U-shaped portion 63 which includes a pair of legs 64 integrally connected together by a bight portion 65. The legs 64 extend from the bight portion 64 convergingly and the end of each opposite the bight portion abuts the corresponding end of the other leg at the juncture of the shank 62 with one of the legs 64. Each leg 64 is provided with an opening similar to the openings 18 formed in the legs 12, 15 of the lever construction shown in Figures 1, 2 and 3. A shaft 66 extends through the openings formed in the legs 64 and is seated on the semicircular portions 67 defining ends of the openings. Integrally formed with each leg 64 is a dog 68 which extends radially toward the shaft 66 and axially outwardly from a plane containing the shank 62 at the end of a respective opening opposite the semicircular portion 67, when the lever 10 is mounted on the shaft 66 but prior to being rigidly clamped thereto, as shown in Figure 10. Each dog 68 is provided with an aperture through which a clamping bolt 69 extends. A nut 70 is threaded on the bolt 69 and when drawn up tightly forces the free ends 71 of the dogs 68 toward each other and the dogs 68 assume a position wherein they are substantially parallel to each other as shown in Figure 11. During the clamping operation when the dogs 68 are moved from their converging relationships, as shown in Figure 10, the parallel relationship shown in Figure 11 by the application of axial forces thereto, it will be appreciated that the shaft 66 is tightly wedged against the semicircular portion 67.

The form of lever construction shown in Figure 12 includes a single strap of sheet metal material 72 having its mid section in the form of a U to provide legs 73 interconnected by a bight portion 74. The legs 73 of the lever are provided with openings which are similar to the openings 18 formed in the legs 12, 13 of the lever construction shown in Figure 1 through which an operating shaft or rod 75 extends. Integrally formed with the free end of each leg 73 is a radially extending flat shank 76. The shanks 76 are arranged back to back and lie in a radial plane spaced axially substantially midway between the legs 73. As in the lever construction shown in Figure 1, dogs 77 extend radially inwardly from each leg 73 and have their free ends adjacent to each other and frictionally engaging the shaft 75. The legs 73 are also provided with registering apertures radially spaced between the dogs 77 and the shanks 76 through which a clamping bolt 78 extends. A lock nut is adapted to be threaded on the bolt 78 and when drawn up sufficiently, as shown in Figure 12, the shanks 76 abut each other and the free ends of the dogs 77 impinge the shaft 75 to thus wedge the same tightly into frictional engagement with the semicircular portions defining the ends of the openings formed in the legs 73.

In the lever construction 10 shown in Figures 13 and 14 a single piece of elongated flat stock is provided with a U-shaped end portion indicated by numeral 79 which includes a pair of legs 80, 81 interconnected by a bight portion 82. Leg 80 is considerably longer than leg 81 and serves as a shank of the lever. Each leg 80, 81 is provided with an opening 83 through which an operating shaft 84 is adapted to extend. One end of each opening 83 is semicircular in shape and defined by a serrated portion of a respective leg 80, 81 which serves as a seat for engaging approximately one-half of the circumference of the shaft 84. The portions of the legs 80, 81 defining the side edges 85 of the openings 83 extend radially and converge as shown in Figure 13. The side edges 85 of the openings 83 merge as indicated by reference character 86. The dogs 87 in the present modification are integrally pressed from the legs 80, 81 and are in the form of semiconical segments with the apex thereof defining the juncture 86 of the marginal edges 85 of the opening 83. The base 88 of each dog 87 is serrated and shaped to conform to the adjacent cylindrical surface of the shaft 84 when the shaft 84 is mounted within the openings 83. A clamping bolt 89 extends through axially aligned apertures provided in the legs 80, 81 at points radially spaced outwardly of the dogs 87. When a lock nut 90 is threaded on the bolt 89 and tightened sufficiently, the base 88 of each dog 87 frictionally engages the shaft 84 and wedges the same tightly against the semicircular serrated leg portions 91 defining the ends of the openings 83 opposite the converging points 86 of the side edges 85. It will be appreciated that because the dogs 87 are in the form of semiconical segments, the base 88 of each dog 87 affords a relatively large area with which to frictionally engage the shaft 88 to further obviate the possibility of the shaft 84 and lever 10 becoming loose in use.

Figures 15 and 16 illustrate an inexpensive but highly efficient clamping device designated in its entirety by numeral 92 for releasably securing a pair of rods or shafts 93, 94 which rods have their longitudinal axes parallel to each other. The coupling device includes a U-shaped sheet metal member 95 having a bight portion 96 interconnecting a pair of substantially parallel legs 97 of substantially the same length. Each leg 97 is provided with an elongated opening 98 therethrough through which the rods 93 and 94 extend. One end of each opening 98 is defined by a semicircular serrated portion 99 of a respective leg 97 and serves as a seat for receiving the rod 93. The side marginal edges 100 of each opening 98 are spaced from each other a distance equal to or slightly greater than the diameter of the rods 93, 94. Extending inwardly of the leg portion defining the opposite end of each opening 98 of each leg 97 is a dog 101. The free end 102 of each dog 101 is curved to conform to the circumference of the rod 94 and is serrated as shown in Figure 16. Each leg 97 is further provided with an aperture radially spaced outwardly of the dogs 101. A clamping bolt 103 extends through the axially aligned apertures and a nut 104 is threaded on the bolt 103. In use rods 93 and 94 may be moved axially with respect to each other to a desired position. Thereafter as the nut 104 is drawn up tightly the legs 97 are caused to approach each other. When this occurs the free ends 102 of the dogs 101 engage each other and the shaft 97 in a plane substantially midway between the legs 97. Further screwing of the nut 104 on the bolt 103 causes the dogs 101 to exert a radial force on the rod 94 which in turn wedges the rod 93 tightly into engagement with the semicircular portions 97.

The embodiments of the invention chosen for the purposes of illustration and description herein are those preferred for achieving the objects of the invention and developing the utility thereof in the most desirable manner, due regard being had to existing factors of economy, simplicity of design and construction, production methods and improvements sought to be effected. It will be appreciated, therefore, that the particular structural and functional aspects emphasized herein are not intended to exclude but rather to suggest such other adaptations and modifications of the invention as fall within the spirit and scope of the invention as defined by the appended claims.

What is claimed is:

1. A combination with a cylindrical shaft, of a stamped sheet metal lever having a substantially U-shaped end and a shank formed by a relatively long extension of one of the legs of said U-shaped end, the other of said legs having a relatively short extension integrally formed therewith, said legs being provided with aligned openings therethrough adapted to receive said shaft, each of said openings having one end thereof defined by a semi-circular portion of a respective leg, a dog integrally formed with each leg and extending radially from the end of a respective opening opposite the semi-circular portion toward the shaft and axially toward the other leg, the free ends of said dogs lying closely adjacent to each other and being curved, the radii of curvature of said free ends being substantially equal to the radius of said shaft, and means carried by said extensions radially outwardly of said dogs and extending substantially parallel to said shaft for moving said curved dog ends axially into engagement with each other and radially into engagement with said shaft to force said shaft firmly into engagement with said semi-circular leg portions.

2. The combination substantially set forth in claim 1, in which, said means includes a bolt and nut assembly extending through axially aligned apertures provided in said extensions, and said semi-circular leg portions and said curved free ends of said dogs are serrated.

References Cited in the file of this patent

UNITED STATES PATENTS

| | | |
|---|---|---|
| 867,009 | Brennan | Sept. 24, 1907 |
| 1,280,310 | Schaffer | Oct. 1, 1918 |
| 1,306,119 | Pharo | June 10, 1919 |
| 1,460,145 | Seiss | June 26, 1923 |
| 1,785,870 | Marles | Dec. 23, 1930 |
| 1,944,531 | Schweiss | Jan. 23, 1934 |
| 2,342,064 | Tinnerman | Feb. 15, 1944 |

FOREIGN PATENTS

| | | |
|---|---|---|
| 114,993 | Sweden | Sept. 18, 1945 |